(No Model.)
W. KRATZER.
ANTI FRICTION BEARING.
No. 335,527. Patented Feb. 2, 1886.
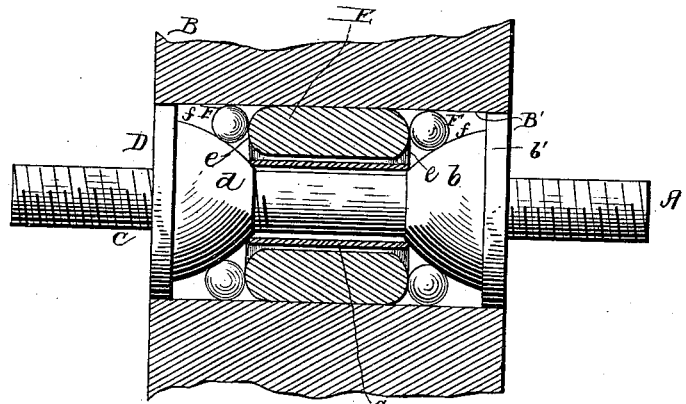
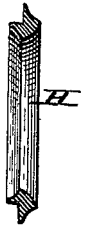
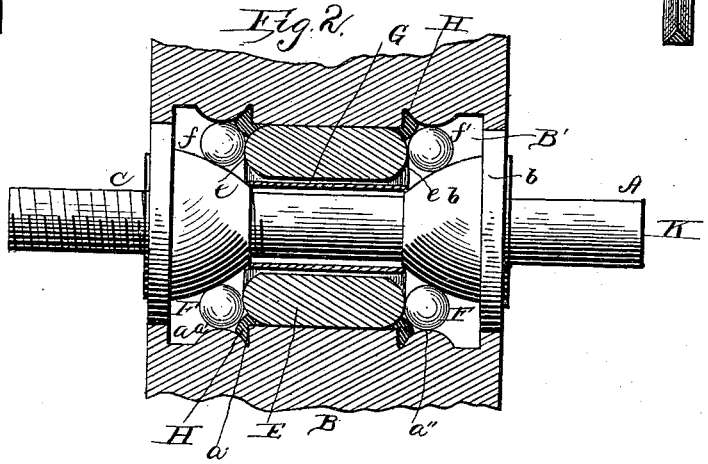
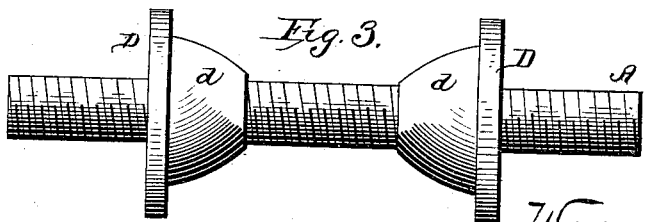
WITNESSES
John Enders Jr.
Harry S. Rohrer.
Wayne Kratzer
INVENTOR
Per Duffy & Brashears
his Attorneys

UNITED STATES PATENT OFFICE.

WAYNE KRATZER, OF ALLENTOWN, PENNSYLVANIA.

ANTI-FRICTION BEARING.

SPECIFICATION forming part of Letters Patent No. 335,527, dated February 2, 1886.

Application filed December 22, 1885. Serial No. 186,451. (No model.)

*To all whom it may concern:*

Be it known that I, WAYNE KRATZER, of Allentown, in the county of Lehigh and State of Pennsylvania, have invented certain new and useful Improvements in Anti-Friction Bearings; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention has relation to anti-friction journal-bearings, and has for its object to furnish a ball-bearing which shall have the smallest possible number of points of contact for each ball, and each of such balls of contact having the least possible surface in contact, and to furnish ball-bearings with means for preventing the balls from falling during the operation of the device, thus preventing the noise incident to such falling.

With these objects in view my invention consists in the improved construction, arrangement, and combination of parts, which I shall now proceed to fully describe and afterward specifically point out in the claims hereto appended.

In the drawings, Figure 1 is a view showing the hub and its interior bushing in section, and the shafts and nut and the balls in elevation. Fig. 2 is a similar view of the same parts, sectional views of the devices for preventing the falling of the balls being also shown. Fig. 3 is a view in elevation of a modified form of shaft and nut removed from the hub. Fig. 4 is a view in perspective of a thimble or sleeve removed from the hub, and Figs. 5 and 6 are views showing two forms of rubber rings for preventing the falling of the balls.

Like letters of reference mark the same parts wherever they occur in the several figures.

Referring to the drawings by letter, A is the shaft, which may be rigidly mounted in stationary bearings, or may be mounted to turn in bearings at each end. In the first case B would represent a portion of the hub of a wheel or any revoluble device, while in the latter B would represent a portion of a stationary bearing in which the shaft rotates. In either case the construction would be the same and the parts would operate on each other in the same way, so that this description will be confined to the first, in which the shaft is fixed. In this case, as before stated, B is a hub of a wheel, or any device which it may be desired to rotate on the shaft. It is centrally perforated at B' to receive the shaft. The shaft is constructed with an enlargement consisting of a semi-spherical, semi-oval, or semi-acorn shaped collar, $b$, and an ordinary shaped or cylindrical collar, $b'$, the former of which is of less diameter than the latter, which fits loosely in the central perforation of the hub. The shaft is threaded at $c$ to receive a nut, D, shaped to correspond with the enlargement of the shaft just described.

E is a bushing or ring, having its ends $e$ rounded, as shown, and is of a size to fit rigidly in the perforation of the hub when driven or forced therein.

F F' are two series of balls, which are placed in the spaces $f f'$, formed between the ends $e$ of the bushing E, the interior of the hub, the curved sides of the enlargement $b$ of the collar, and the corresponding curved sides, $d$, of the nut D.

G is a sleeve, which is smaller in diameter than the interior of the bushing E and larger than the shaft. It serves the purpose of a stop to prevent the nut D being screwed too far on the shaft, and acts at the same time as a locknut to prevent its coming loose. I construct this sleeve either with or without slits $g$, as shown in Fig. 5, the purpose of such slits being to allow of a slight expansion or contraction, if necessary, in adjusting the nut.

H is a ring of rubber or other similar material, which I place as shown in Fig. 2, so that the balls in their revolution will come in contact therewith and roll thereon, and preventing them from falling one upon another and making the disagreeable rattling noise peculiar to ball-bearings as now constructed. This ring also assists in keeping the bearing lubricated, as the lubricant will be retained by it much longer than the balls or the parts with which they come in contact, which are or should be made of polished hardened steel. This ring is shown in Fig. 5 of a construction to fit the shape of opening or chamber shown in Fig. 2, while in Fig. 6 it is made to fit that of Fig. 1. Its shape may be varied to fit any chamber into which it is to be placed, it being only necessary that a suitable surface be presented for contact with the balls. As the balls roll thereon, very little friction occurs. The elasticity of this ring keeps the balls pressed against the other parts, and this effectually prevents the falling complained of.

In Fig. 1 I have shown the central perforation of the hub is cylindrical throughout, which gives one bearing-point not curved, while in Fig. 2 I show two undercut grooves, $a$ and $a'$, at each end of such perforation, the rib $a''$ between them being substantially semicircular in section, so that the ball has in either construction but three (the smallest possible number) points of contact, and in the construction shown in Fig. 2 each of said points of contact is convex. The surface of the balls being also convex, the smallest possible amount of surface is in contact, thus rendering the device as near frictionless as possible.

In Fig. 1 both ends of the shaft are threaded. The thread outside of the enlargement of the shaft is for the purpose of receiving a rubber cap, (shown in outline in said figure,) which cap is for the purpose of deadening the whirring or humming of such joints or bearings, especially in machinery where the wheel or other rotating device is run at a very high rate of speed. In Fig. 2 this cap is shown marked K, and slipped on the smooth end of the shaft, it being immaterial whether it be threaded or smooth. The shaft is threaded its whole length in Fig. 3, and instead of an enlargement thereof I show two nuts. The purpose of this construction is to admit of the adjustment of the hub to any position on the shaft in which it may be desirable to have it run. This can be done by loosening one nut, placing it in the proper position, and then moving the other nut up to its proper relative position to secure the parts in working order.

By means of the constructions and arrangements of devices as shown, a bearing is formed which is almost practically frictionless. The balls each bear on the metallic parts at only three points, and each of these points of contact is made of two convexities, so that they are practically as well as theoretically points of contact. The bearing is as near as possible noiseless in operation, the falling of the balls upon each other, especially in such devices as rotate slowly, being effectually prevented by the insertion of the rubber ring, which ring also serves, as before stated, to assist in retaining the lubricant.

The provision of two nuts permits of an adjustment, as hereinafter set forth, very desirable in some machines, and not possible with ball-bearings as heretofore made.

The bushing in the hub is rendered necessary by the fact that it is very difficult and very expensive to turn out such a perforation with a central inward-projecting solid collar to perform the office of the bushing, and for the further reason that the bushing may be replaced when worn without renewing the whole hub.

Having thus fully described my invention, what I claim, and desire to secure by Letters Patent of the United States, is—

1. An anti-friction journal-bearing consisting of a fixed and a revoluble device having balls arranged between and in contact with them, the points of contact being formed convex, as set forth.

2. In combination, the hub, its bushing having rounded ends, the shaft, and the balls, as and for the purpose set forth.

3. In combination, the hub, its bushing, the shaft having convex bearing-points, and the balls, as set forth.

4. In combination, the hub having inward-projecting convex or curved ribs $a''$, its bushing, the shaft, and the balls, as and for the purpose set forth.

5. In combination, the hub having inward-projecting convex or curved ribs $a''$, its bushing having curved ends, the balls, and the shaft having convex points of contact, as set forth.

6. In combination, the shaft having inward-projecting convex ribs, the bushing having curved ends, balls, the shaft having curved points of contact, and the sleeve or thimble, for the purpose set forth.

7. In combination, the shaft, its bushing, the balls, the shaft, and the thimble or sleeve having slitted ends, as and for the purpose set forth.

8. In combination with the stationary and movable parts and the balls of a ball-bearing, a ring of rubber or other similar material inserted and secured in position to be in contact with the balls, for the purpose set forth.

9. In combination, the hub, the bushing, the balls, the shaft, and the two nuts with bearing-surfaces, as and for the purpose set forth.

In testimony that I claim the foregoing as my own I hereunto affix my signature in presence of two witnesses.

WAYNE KRATZER.

Witnesses:
O. E. DUFFY,
F. R. HARDING.